Patented Sept. 8, 1953

2,651,599

UNITED STATES PATENT OFFICE 2,651,599

TREATING CONVERSION CATALYSTS

Rhea N. Watts and Julius P. Bilisoly, Baton Rouge, La., assignors to Standard Oil Development Company, a corporation of Delaware No Drawing. Application September 8, 1949, Serial No. 114,683

5 Claims. (Cl. 196—52)

1

This invention relates to processes for the conversion of hydrocarbons and more particularly relates to processes for reactivating or revivifying hydrocarbon conversion catalysts which have undergone degradation or loss of activity or selectivity after prolonged use, or for maintaining catalyst activity or selectivity during use.

Processes for the catalytic conversion or cracking of hydrocarbons are well known and the catalysts may be used as a fixed bed, moving bed, or in the form of a powder or spherical catalyst in the fluid technique or suspensoid process and the like.

During the conversion or cracking of hydrocarbons, there is a deposition of coke or carbonaceous material on the catalyst, and in the commercial operations the catalyst is regenerated by burning the coke with air or other oxygen-containing gas. The regeneration may be effected in other ways. After regeneration the catalyst is again used in another conversion operation. The cycles of a conversion followed by a regeneration are continued and after some time the catalyst loses some of its activity and also its selectivity. The loss in activity shows up when there is less conversion of the feed stock to desired products such as gasoline in the cracking process. Also as the catalyst becomes older and somewhat degraded more coke and more gas are formed and this shows that some of the feed stock is being converted to undesirable products. When such catalyst produces more coke and more gas it is stated to have less selectivity.

Hereinafter this quality of the catalyst will be referred to by designating the carbon and gas producing effects as the relative carbon production factor (which will be referred to as RCF) and the relative gas production factor (which will be hereinafter referred to as RGF). The relative carbon production factor is defined as the ratio of the carbon produced by a catalyst being tested to that produced by a standard uncontaminated catalyst at the same conversion level. The RCF ranges from 1.0 for fresh catalyst to 1.5 to 2.0 or higher for equilibrium catalyst in a fluid unit. The relative gas production factor is defined as the ratio of the amount of dry gas (cu. ft. per barrel of feed oil) produced by the catalyst being tested to the amount of dry gas produced by a standard uncontaminated catalyst at the same conversion level.

Equilibrium catalyst in a fluid unit may be generally described as follows. When fresh catalyst is first put in a cracking unit it has a relatively high activity but after it is in a unit for a while this activity drops off rapidly and levels off at a lower activity but there is a general downward trend. Equilibrium catalyst is that catalyst which has been in the unit for an extended period of time and which is being maintained at a substantially constant activity and selectivity by the addition of fresh make-up catalyst.

The activity of the catalyst is indicated by the amount of gas oil feed cracked or converted to other products and is designated as conversion on the basis of a standardized laboratory test. This test has been described in the chemical literature (see Conn, M. E., and Connolly, G. C., Ind. Eng. Chem., 39, p. 1138, September 1947), and is carried on in a fixed-bed unit employing 200 cc. of pilled catalyst. The testing unit is referred to as a 200 cc. testing unit. The catalyst bed is in a reaction tube maintained at about 850° F. and the oil to be cracked (East Texas light gas oil in this case) is passed through this bed at a rate of 120 cc./hr. The cycle requires two hours during which 240 cc. of oil are cracked.

In the cracking operation, gases and coke are formed, as well as normally liquid hydrocarbons, with the coke being deposited on the catalyst. The cracked liquid product is examined for gasoline content in the ASTM D-86-46 distillation apparatus. The amount of gasoline distilled from a 100 cc. charge of the cracked liquid product at a vapor temperature of 400° F. is designated as distillate or D. The residual portion left in the flask is measured and may be designated as R. The loss, or L, is determined by adding D and R and subtracting this total from 100. The sum of D+L, or distillate plus loss, is another criterion of activity and selectivity since it shows the yield of desirable product such as gasoline produced. The measure of conversion is obtained by subtracting the percentage of gas oil residual material (R) based on feed from 100.

Various treatments have been tried for reactivating powdered conversion catalysts but these included removing used catalysts from the units and treating the catalyst as a batch outside the cracking unit whereas the present process is concerned with treating the catalyst in the unit during the operation of the conversion process.

During operation of conversion or cracking processes especially in the fluid process where powdered catalyst or microspherical catalyst is circulated through the unit, the catalyst apparently becomes contaminated with metal or metal compounds such as iron, nickel, etc. and these contaminants reduce the activity of the catalyst and also cause the catalyst to produce more gas and coke than a fresh or uncontaminated catalyst. Also some of the contamination may come from the hydrocarbon feed stock. By reducing the gas and carbon make attributable to the contaminants during conversion or cracking considerable financial benefits due to increased yields of valuable products are realized and further a smaller amount of valuable feed stock is wasted by being converted to undesirable gas and coke.

According to this invention after a conversion catalyst has been used for conversion or cracking operations and the catalyst has been regenerated by burning off the coke with air or other oxygen-containing gas, the catalyst is reactivated in the cracking unit by treating the catalyst following regeneration and at substantially regeneration temperature with a fluorine-containing material, preferably a volatile fluoride such as anhydrous hydrogen fluoride.

In the convention or cracking of hydrocarbons where coke or carbonaceous material is deposited on the catalyst, the regeneration of the catalysts effects the removal of coke by burning or some other means and this is generally referred to in the art as regeneration. In the present case, the treatment of the catalyst is a reactivation or revivification and is different from the regeneration process. As above pointed out, after repeated conversions and regenerations the catalyst loses some of its activity and selectivity, and the present reactivation treatment restores some or all of the activity and selectivity of the catalyst.

It has now been found that synthetically prepared cracking catalysts such as silica-alumina, silica-magnesia, silica-magnesia-alumina, etc., that have suffered loss in activity and/or selectivity after a number of alternate hydrocarbon conversion operations such as cracking of gas oils to produce gasoline where coke is deposited on the catalyst and the catalyst is regenerated by burning, may have their activity and selectivity wholly restored or at least to some extent by treating the regenerated catalyst with gaseous hydrofluoric acid or other fluorine-containing compounds at substantially regeneration temperatures or at a substantially elevated temperature approaching regeneration temperature. The treatment with the fluorine containing compound may be continuous following the regeneration step in a fluid unit or moving bed or it may be periodic or intermittent.

One or more fluoride reactivation cycles may be followed in a fixed bed by a number of conversion and regeneration cycles without the fluorine containing compound treatment. The processes may be used with catalysts which are in a fixed bed, in a moving bed, as powdered catalyst in a fluid operation, in suspensoid cracking or conversion and similar operations.

The feed stock to the cracking zone may be gas oil, reduced crude, whole crude, naphtha, etc. and the temperature during conversion or cracking may be between about 750° F. and 1100° F. for a period sufficient to give the desired conversion. The pressure on the unit may be atmospheric to about 100 lbs. per sq. in. During regeneration the temperature may be between about 850° F. and 1150° F.

The treatment of the conversion catalyst which has been impaired and has a lower activity and selectivity is carried out by subjecting the regenerated catalyst while in the unit at a temperature of about 750° to 1150° F. to the action of anhydrous hydrofluoric acid in a rather small amount and preferably mixed with steam. The preferred treating temperature is 850° F. to 950° F. Instead of using anhydrous hydrofluoric acid, other fluorides which are gaseous or vaporizable such as boron fluoride, ammonium fluoride, hydrofluosilicic acid and fluorine may be used. When the fluorine containing compound is gaseous or vaporizable it can be added as a gas with steam or nitrogen or a mixture thereof or alone. By adding it with a diluent or carrier gas, it is more easily supplied to the unit in measured quantities.

Where a solution of the fluorine containing compound in water or other liquid is used, the solution is preferably vaporized in the unit. The amount of hydrofluoric acid or other fluorine containing compound used may vary in the ratio of between about 0.01 pound to 10 pounds of anhydrous hydrofluoric acid or other fluorine containing compound per hundred pounds of catalyst per 24 hours. This amount of hydrofluoric acid is referred to as the dosage and gives the actual weight of the anhydrous hydrofluoric acid used per hundred pounds of catalyst. This dosage can be broadly defined as parts by weight of the fluorine containing compound to 100 parts by weight of the catalyst. In the example later to be given, the dosage is in grams of the anhydrous HF to 100 grams of catalyst. Numerically this figure is the same irrespective of the unit chosen.

The hydrofluoric acid may be added as an aqueous solution which is completely vaporized by being passed through a heated section of pipe before admittance to the unit. The effect is to add a mixture of HF and steam at substantially the same temperature as that of the catalyst in the unit. An alternate method would be to admit vaporous anhydrous HF by itself and add steam separately to the unit if it is found desirable, or to rely on the steam normally present in the unit from stripping operations or from the conversion reaction. Where aqueous hydrofluoric acid is employed such solution is preferably of 0.01% to 10% by weight composition. Small amounts of HF in the lower portion of the range given are preferred, say below about 5% by weight composition.

In the specific example to be given presently the catalyst was a powdered catalyst taken from a commercial catalytic cracking plant and was a synthetically prepared silica-alumina catalyst containing about 13% alumina. The catalyst was pilled into cylinders of about $\frac{3}{16}''$ by $\frac{3}{16}''$. The used catalyst had a relatively low activity and selectivity. The catalyst pills (200 cc.) were placed in a 200 cc. fixed-bed unit. East Texas gas oil was fed to the unit at a rate of 0.6 v./v./hr. and a 2-hour cycle was used. The oil was cracked at a temperature of about 850° F. and the hydrogen fluoride reactivation treatment was carried out at a temperature of about 850° F.

After a cracking cycle the catalyst was purged with nitrogen for about 30 minutes and was then regenerated with air diluted with nitrogen at a temperature of about 1050° F. Toward the end of the regeneration only air was passed through the catalyst bed. The regeneration for each cycle took about 8 hours. After each regeneration cycle and before a cracking cycle the catalyst was reactivated or revivified with 0.3% of anhydrous HF based on the weight of catalyst. In addition to HF, about 5.7% of water (basis feed) in the form of steam was present, as well as a certain amount of nitrogen which in this case was one cubic foot for the treating period, the nitrogen and steam serving as carrying agents. The gaseous mixture containing the HF, nitrogen, and steam was passed over the catalyst for each treatment for about one hour. The results are shown in Table I.

TABLE I

| Catalyst | Total HF Treat, Percent on Catalyst | Cycle No. | Conversion | Percent D+L | RCF | RGF |
|---|---|---|---|---|---|---|
| Untreated | None | 1 | | 26.5 | | |
| | do | 2 | 28.9 | 26.0 | 1.71 | 2.00 |
| Treated with 0.3% HF (on catalyst) per cycle for 1 hr. after regeneration. | None | 1 | | 26.5 | | |
| | 0.3 | 2 | | 31.0 | | 1.50 |
| | 0.6 | 3 | | 34.0 | | 1.34 |
| | 0.9 | 4 | | 37.5 | | 1.22 |
| | 1.2 | 5 | 40.6 | 39.0 | 1.05 | 1.10 |

It will be noted that the HF was added to the catalyst after four regeneration cycles, making a total treatment amounting to 1.2% of HF. In the above the cycle number means, for example, in the case of the untreated catalyst, that there was a cracking step, a stripping step and a carbon-burning or regeneration step and then a second cracking step and stripping step, but no second regeneration or carbon burning step because the catalyst was removed from the unit and the carbon was determined for RCF.

In the reactivations with the fluorine-containing compound there were five cracking and five stripping steps, four reactivations and four carbon-burning steps but no regeneration or reactivation after the fifth cycle because the catalyst was removed from the unit and the carbon determined for the RCF. From the above data it will be seen that the activity of the catalyst for the number of cycles shown increased from 26.0% $D+L$ for the deactivated catalyst to 39.% $D+L$ for the revivified catalyst and that the RCF decreased from about 1.71 to 1.05 and the RGF decreased from about 2.00 to 1.10.

In another example using silica-alumina cracking catalyst which had lowered activity and selectivity, the treating material was boron fluoride dissolved in water to give a 5% solution and the $D+L$ percentage was raised from 20.0 to 26.0%. The RCF was reduced from 2.33 to 1.56 and the RGF was reduced from 2.54 to 1.17. The conditions of operation for the data given in Table II are substantially the same as above given for Table I as the process was carried out in the 200 cc. unit. The $BF_3$ reactivation treatment after regeneration of the catalyst was carried out at a temperature of about 850° F. After a cracking cycle the catalyst was purged with nitrogen for about 30 minutes and was then regenerated with air diluted with nitrogen at a temperature of about 1050° F. During regeneration the percentage of air was increased and toward the end of the regeneration only air was passed through the catalyst bed. The regeneration for each cycle took about 8 hours.

After each regeneration period and before a cracking period, the catalyst was treated with 0.3% of $BF_3$ based on the weight of catalyst. In addition to the $BF_3$, about 5% of water in the form of steam was present as well as a certain amount of nitrogen (1 cubic foot), the nitrogen and steam acting as carrying agents. The gaseous mixture containing $BF_3$, nitrogen and steam was passed over the catalyst for about two hours.

The results are shown in Table II.

TABLE II

| Catalyst | Total $BF_3$ Treat, Percent on Catalyst | Cycle No. | Conversion | Percent D+L | RCF | RGF |
|---|---|---|---|---|---|---|
| Untreated | None | 1 | | 19.0 | | |
| | do | 2 | 23.0 | 20.0 | 2.33 | 2.54 |
| Treat with 0.3% $BF_3$ (on catalyst) per cycle for 2 hours after regeneration. | None | 1 | | 20.5 | | |
| | | 2 | | 21.5 | | 1.94 |
| | | 3 | | 24.5 | | 1.58 |
| | | 4 | | 23.0 | | 1.64 |
| | | 5 | | 27.0 | | 1.42 |
| | | 6 | | 28.5 | | 1.26 |
| | | 7 | 26.7 | 26.0 | 1.56 | 1.17 |

The present invention is useful for revivifying or reactivating catalysts which have been used in fixed bed, moving bed or powdered catalyst operation, the revivification with hydrofluoric acid or other fluorine substance taking place after the catalyst has been regenerated. The regeneration procedure in fixed beds is well known and need not be repeated here. In such fixed-bed processes the reactivation is carried out substantially as set forth in the first example above and the hydrogen fluoride or $BF_3$ are diluted with steam and used in only small quantities. The treatment may follow only one regeneration step and then the catalyst may be used for a number of conversion operations and regenerated without fluoride treatment but preferably the catalyst in the fixed bed will be subjected to a series of reactivation treatments following a successive number of regenerations and then is used for a series of conversions and regenerations without fluoride treatment.

In the moving bed type of process the catalyst passing through the stripping section following a regeneration step may be used as the place for reactivating the catalyst with the hydrofluoric acid or other fluorine-containing compounds.

In powdered catalyst operations using fluidized catalyst the hot regenerated catalyst may be subjected to the reactivation or revivification treatment in any desired manner but under the conditions of temperature and concentration, etc. above given. In most of the cracking units the catalyst is withdrawn as a dense fluidized mixture from the regenerator into the upper part of the regenerator standpipe. The reactivating fluorine-containing compound may be added to the upper part of the regenerator standpipe while the catalyst is in the dense fluidized phase. An alternate method would be to provide a separate external vessel so that the hot regenerated catalyst from the regenerator may be separately treated while maintaining the catalyst in a dense fluidized liquid simulating condition. Where a separate external vessel is used the effluent gases are smaller in volume and will be more easily handled than the effluent gases from the regenerator. Stripping of the regenerated catalyst in such external vessel may be carried out at the time of revivification. The revivification may be continuous or intermittent.

The fluorine containing substance may be added to a carrier gas such as steam or nitrogen and such mixture used to revivify the catalyst or the fluorine containing substance may be used alone. The fluorine containing substance may be added to stripping gas if it is used for stripping regenerated catalyst or it may be added with the aerating gas for the catalyst in the regenerator standpipe.

In the revivification and stripping section, the regenerated catalyst will be at a temperature between about 750° F. and 1150° F. and the selected amount of hydrofluoric acid gas or other volatilized or gaseous fluorine compound with steam will be passed upwardly through the revivification section at such a velocity to maintain the silica-alumina or other conversion catalyst particles as a dry liquid-simulating mixture having a density of about 25 lbs. to 40 lbs. per cubic foot when the regenerated catalyst standpipe is used as the revivification section, but when using the separate treating vessel or other means, the dense fluidized catalyst mixture during revivification may have a density as low as 15 pounds per cubic foot and may be as high as 40 pounds per cubic foot.

While the action of the fluorine compound is not known at present one reasonable explanation is that the fluorine compound forms an active catalyst with the catalyst being treated or promotes the formation of active catalyst surfaces. However, the invention is not to be restricted to this explanation.

By reactivating the catalyst following regeneration there is no contamination of the cracked products as might be the case if the reactivation were carried out during the cracking operation. When revivifying the used catalyst continuously, smaller amounts of the fluorine containing substance are used than when revivifying the catalyst intermittently.

What is claimed is:

1. In a process for reactivating a circulating cracking catalyst consisting essentially of a synthetic composite selected from the group consisting of silica-alumina, silica-magnesia and silica-magnesia-alumina which has been subjected to repeated regenerations following conversion operations without removal from the system and which has lost activity and selectivity, the improvement which comprises treating the regenerated catalyst following the regeneration step with a gas mixture consisting essentially of steam containing admixed therewith about 0.01 to 10 weight percent of hydrogen fluoride at a temperature of at least 850° F., the total amount of hydrogen fluoride so used being in the ratio between about 0.01 to 10 pounds per 100 pounds of catalyst per 24 hours, and then using the resulting revivified and regenerated catalyst in the conversion step without further treating the catalyst to remove hydrofluoric acid gas therefrom.

2. In a process of cracking hydrocarbon oils by contacting hydrocarbons in a cracking zone with a moving finely divided cracking catalyst selected from the group consisting of silica-alumina, silica-magnesia and silica-magnesia-alumina at a temperature between about 750° F. and 1100° F. and periodically regenerating the catalyst in a regeneration zone in a dense fluidized liquid-simulating condition at a temperature between about 850° F. and 1150° F. by burning off carbonaceous deposits thereon and withdrawing dense fluidized liquid-simulating regenerated catalyst from the regeneration zone into a standpipe, the improvement which comprises subjecting the withdrawn regenerated catalyst substantially at regeneration temperature in said standpipe to a reactivation or revivification treatment by subjecting the catalyst to the action of a gas mixture consisting essentially of steam admixed with about 0.01 to 10 weight percent of a volatile inorganic fluorine compound, the total amount of the fluorine compound so used being in the ratio of about 0.01 pound to 10 pounds per 100 pounds of catalyst per 24 hours, and immediately thereafter returning the resulting regenerated, reactivated catalyst to the cracking zone.

3. The process according to claim 2 wherein the volatile fluorine compound is hydrofluoric acid gas.

4. In the continuous process of cracking gas oils to produce gasoline by contacting gas oil in a cracking zone with a powdered synthetically prepared silica-alumina cracking catalyst at a temperature between about 750° F. and 1100° F. and regenerating the resulting spent or fouled catalyst continuously withdrawn from the cracking zone in a regeneration zone while the catalyst is in a dense dry fluidized liquid-simulating condition at a temperature between about 850° F. and 1150° F. by burning of carbonaceous deposits thereon with air and continuously withdrawing dense fluidized liquid-simulating hot regenerated catalyst from the regeneration zone, the improvement which consists of continuously reactivating or revivifying the withdrawn hot regenerated catalyst while in dense fluidized condition and at substantially regeneration temperature by treating the catalyst with a gas mixture consisting essentially of steam and about 0.01 to 5 weight per cent of hydrogen fluoride, the gas mixture being used in a ratio corresponding to about 0.01 to 10 pounds of hydrogen fluoride per 100 pounds of catalyst per 24 hours, and immediately after the reactivating treatment returning the resulting regenerated, reactivated catalyst to said cracking zone.

5. A process according to claim 4 wherein the steam-hydrogen fluoride mixture is obtained by adding an aqueous solution containing 0.01 to 5 weight percent of hydrogen fluoride, which solution is evaporated in the process.

RHEA N. WATTS.
JULIUS P. BILISOLY.

References Cited in the file of this patent

UNITED STATES PATENTS

| Number | Name | Date |
|---|---|---|
| 2,430,735 | Ray et al. | Nov. 11, 1947 |
| 2,481,253 | Snyder | Sept. 6, 1949 |
| 2,488,718 | Forrester | Nov. 22, 1949 |
| 2,525,812 | Lien et al. | Oct. 17, 1950 |
| 2,558,375 | Olson | June 26, 1951 |
| 2,580,004 | Corneil | Dec. 25, 1951 |